(12) United States Patent
Kawamura et al.

(10) Patent No.: US 8,719,542 B2
(45) Date of Patent: May 6, 2014

(54) DATA TRANSFER APPARATUS, DATA TRANSFER METHOD AND PROCESSOR

(75) Inventors: Yuji Kawamura, Kanagawa (JP); Takeshi Yamazaki, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 504 days.

(21) Appl. No.: 12/550,936

(22) Filed: Aug. 31, 2009

(65) Prior Publication Data

US 2010/0058024 A1 Mar. 4, 2010

(30) Foreign Application Priority Data

Sep. 1, 2008 (JP) ................................. 2008-223698

(51) Int. Cl.
*G06F 12/00* (2006.01)
(52) U.S. Cl.
USPC ............................. 711/203; 711/151; 710/22
(58) Field of Classification Search
None
See application file for complete search history.

(56) References Cited

U.S. PATENT DOCUMENTS 6,006,287 A * 12/1999 Wakazu ........................ 710/22
2009/0276571 A1* 11/2009 Benner et al. ................ 711/118

FOREIGN PATENT DOCUMENTS

| JP | 08077062 A | 3/1996 |
| JP | 2005182538 A | 7/2005 |
| JP | 2005-258509 A | 9/2005 |

OTHER PUBLICATIONS

Office Action for corresponding Japanese Patent Application No. 2008-223698, dated Jun. 5, 2012.
Office Action for corresponding JP Patent Application No. 2008-223698, dated Jan. 22, 2013.

* cited by examiner

*Primary Examiner* — Reginald Bragdon
*Assistant Examiner* — Baboucarr Faal
(74) *Attorney, Agent, or Firm* — Matthew B. Dernier, Esq.; Gibson & Dernier LLP (57) ABSTRACT

A processor includes a CPU core which executes a user program, and a data transfer apparatus. The CPU core stores a transfer request from a user program in a specific area of a main memory, in which the transfer request specifies the virtual addresses of a transfer source and a transfer destination in a memory space allocated to the user program. The data transfer apparatus refers to the specific area of the main memory and acquires a transfer request asynchronously to processing performed by the CPU core. The data transfer apparatus then identifies physical addresses corresponding to virtual addresses specified in the transfer request. After that, the data transfer apparatus transcribes original data stored in a storage area indicated by the physical address of the transfer source, to a storage area in a cache memory related to the virtual address or physical address of the transfer destination.

8 Claims, 4 Drawing Sheets

FIG.1

INFORMATION PROCESSING APPARATUS 1000

FIG.2A

| TRANSFER SOURCE'S VIRTUAL ADDRESS | TRANSFER DESTINATION'S VIRTUAL ADDRESS | DATA SIZE | ... |
|---|---|---|---|

FIG.2B

| TRANSFER SOURCE'S VIRTUAL ADDRESS | TRANSFER DESTINATION'S VIRTUAL ADDRESS | DATA SIZE | TAG | ... |
|---|---|---|---|---|

DATA TRANSFER APPARATUS, DATA TRANSFER METHOD AND PROCESSOR

BACKGROUND OF THE INVENTION

1. Field of the Invention

The present invention relates to a data processing technique, and particularly to a data transfer technique.

2. Description of the Related Art

With a game device or another multimedia terminal, there is frequent need to read and write image data or audio data from and into a memory. In order to reduce the load on a CPU (Central Processing Unit), data transfer between a memory and an external input/output apparatus is often performed using DMA (Direct Memory Access) transfer. DMA transfer is a method for performing high-speed data transfer between a memory and an input/output apparatus without CPU intervention.

DMA transfer is executed after a CPU determines the necessity thereof and provides an instruction to a DMA controller. Therefore, DMA transfer could not have been directly controlled by a user program executed by the CPU, such as a program created by a user of a multimedia terminal. Meanwhile, in general data transfer, such as copying a character string, since a CPU core including an arithmetic circuit or the like primarily performs the transfer in response to a request from a user program, the CPU core has sometimes been subjected to a relatively heavy load.

SUMMARY OF THE INVENTION

The present invention has been made in view of such problems, and a main purpose thereof is to provide a technique for performing data transfer according to control provided by a user program, as a process asynchronous to that performed by a CPU core.

To solve the problems above, one embodiment of the present invention relates to a data transfer apparatus for transferring data in a storage area to another storage area. The data transfer apparatus comprises: an acquisition unit which acquires a transfer request from a user program executed by a CPU core, via a predetermined area of a memory space allocated to the user program, in which the transfer request specifies at least virtual addresses of a transfer source and a transfer destination in the memory space, and the acquisition unit acquires the transfer request asynchronously to processing performed by the CPU core; an identification unit which identifies a physical address corresponding to a virtual address specified in a transfer request; and a transcription unit which transcribes original data stored in a storage area indicated by a physical address of a transfer source specified by the identification unit, to a storage area indicated by a virtual address or a physical address of a transfer destination.

Another embodiment of the present invention relates to a data transfer method for transferring data in a storage area to another storage area. The method comprises: acquiring a transfer request from a user program executed by a CPU core, via a predetermined area of a memory space allocated to the user program, in which the transfer request specifies at least virtual addresses of a transfer source and a transfer destination in the memory space, and the acquiring is performed asynchronously to processing performed by the CPU core; identifying a physical address corresponding to a virtual address specified in a transfer request; and transcribing original data stored in a storage area indicated by a physical address of a transfer source specified by the identifying, to a storage area indicated by a virtual address or a physical address of a transfer destination.

Yet another embodiment of the present invention relates to a processor. The processor comprises: a CPU core which executes a user program; and a data transfer apparatus which transfers data in a storage area to another storage area. The CPU core stores a transfer request from a user program in a predetermined area of a memory space allocated to the user program, in which the transfer request specifies at least virtual addresses of a transfer source and a transfer destination in the memory space. The data transfer apparatus includes: an acquisition unit which refers to a predetermined area of a memory space and acquires a transfer request asynchronously to processing performed by the CPU core; an identification unit which identifies a physical address corresponding to a virtual address specified in a transfer request; and a transcription unit which transcribes original data stored in a storage area indicated by a physical address of a transfer source specified by the identification unit, to a storage area indicated by a virtual address or a physical address of a transfer destination.

Optional combinations of the aforementioned constituting elements, and implementations of the invention in the form of apparatuses, methods, systems, programs, and recording media storing programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
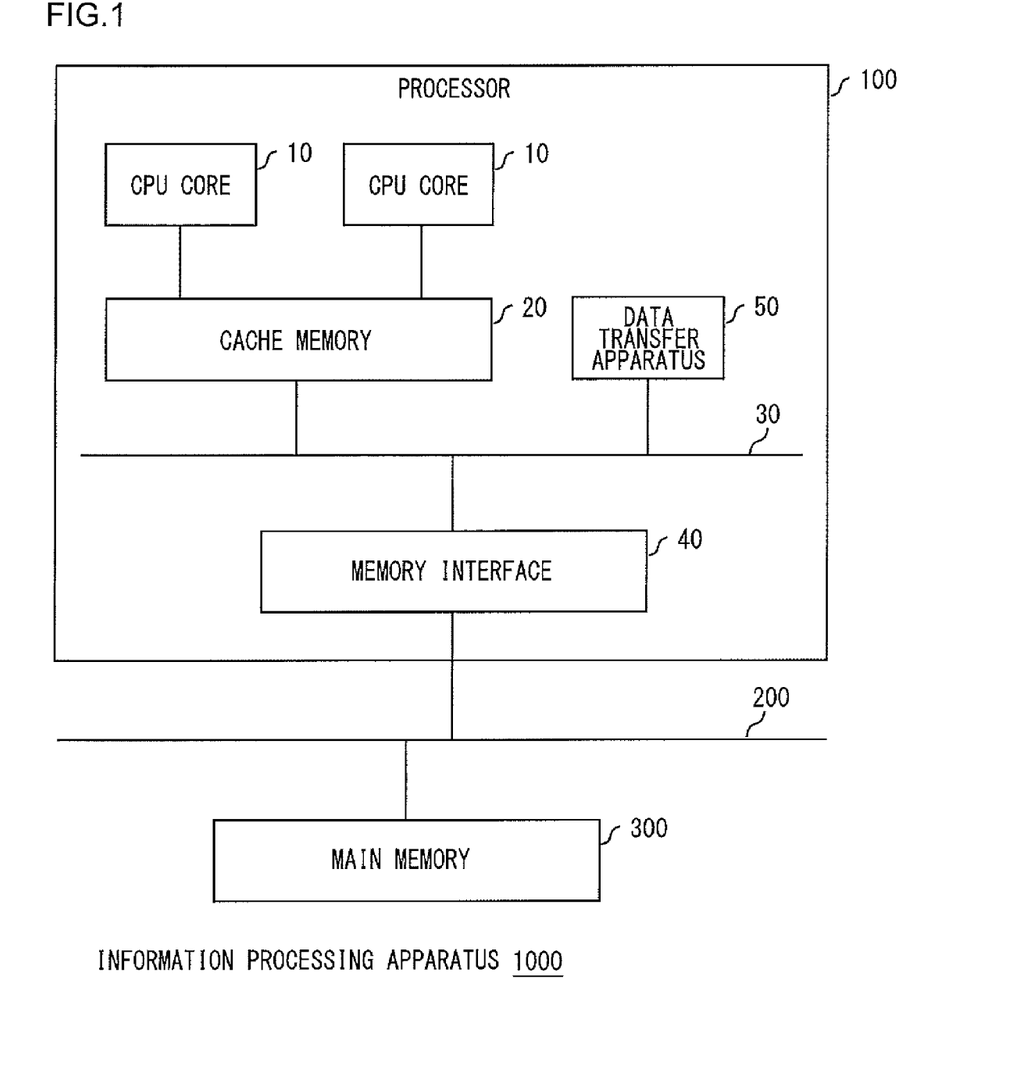
FIG. 1 is a diagram that shows a hardware configuration of an information processing apparatus according to an embodiment of the present invention.

FIG. 1 shows a hardware configuration of an information processing apparatus 1000 according to an embodiment of the present invention. The information processing apparatus 1000 comprises a processor 100 and a main memory 300, which are connected to each other via an external bus 200. The processor 100 controls the entirety of the information processing apparatus 1000 and performs various processes according to a program loaded from an external storage apparatus or a recording medium into the main memory 300. In the main memory 300 is also stored data necessary for the processor 100 to perform various processes, as needed. In the information processing apparatus 1000, an OS (Operating System) is installed and runs thereon, which provides functions and environments for efficient use of the information processing apparatus and overall control of the entirety of the information processing apparatus.

The processor 100 is a multi-core processor and comprises two CPU cores 10, a cache memory 20, a memory interface

40 and a data transfer apparatus 50. These constituting elements are connected to one another via an internal bus 30 with which coherence of data transmitted from one constituting element to another can be maintained. As the processor 100, these constituting elements are integrally formed on a single chip. Since there is no limit on the number of the CPU core 10, cache memory 20 or data transfer apparatus 50 to be integrated on the processor 100, the number thereof may be appropriately determined based on performance requirement of the multi-core processor, etc.

Each CPU core 10 includes an arithmetic unit for executing an instruction described in a user program, and various registers. The cache memory 20 temporarily caches part of data stored in the main memory 300 in accordance with a publicly-known cache algorithm, thereby providing a CPU core 10 with fast data access. The memory interface 40 provides an interface function for allowing each constituting element of the processor 100 to access the main memory 300.

When necessary data is stored in the cache memory 20, a CPU core 10 acquires the data therefrom. If necessary data is not stored in the cache memory 20, a CPU core 10 will acquire the data from the main memory 300 via the memory interface 40.

The data transfer apparatus 50 performs data transfer in response to a request from a user program executed by a CPU core 10 (hereinafter, also referred to as "transfer request", as needed) asynchronously to processing performed by the CPU core 10. The data transfer apparatus 50 of the present embodiment transfers data specified by a transfer request, among data stored in the main memory 300, to the cache memory 20.

Figure 2A:
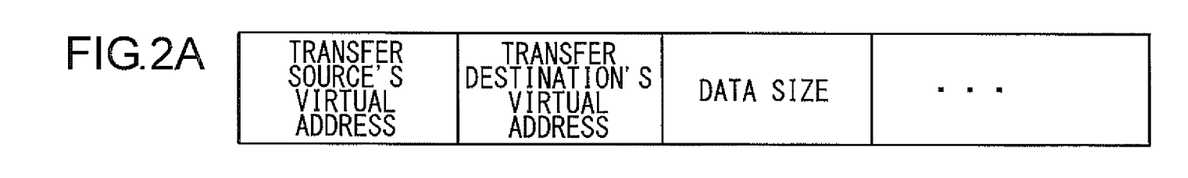
FIG. 2a and FIG. 2b are diagrams that show data structures of transfer requests.
Figure 2B:
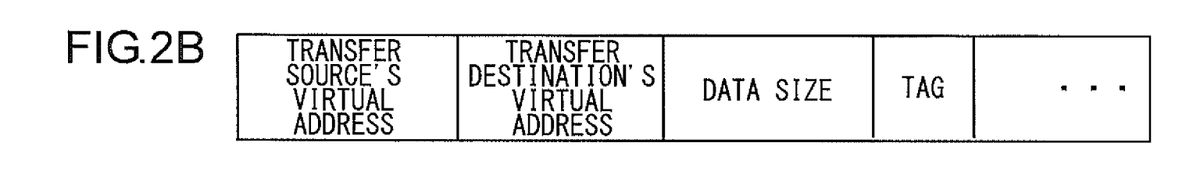

FIG. 2A and FIG. 2*b* show data structures of transfer requests. FIG. 2A shows a data structure of a basic type of transfer request (hereinafter, also referred to as "basic transfer request", as needed). In a basic transfer request is specified virtual addresses of the top positions of a transfer source and a transfer destination (hereinafter, also referred to as "transfer source's virtual address" and "transfer destination's virtual address", as needed) within a memory space allocated to a user program (hereinafter, also referred to as "user memory space", as needed). Also, a "data size", which indicates the amount of data to be transferred from the position of a transfer source's virtual address, is specified in a basic transfer request.

A "virtual address" in the present embodiment is information indicating a specific position in virtual storage provided by an OS. The virtual storage is a means for managing storage areas by which part of a physical storage area in each storage means, such as a memory inside or outside the information processing apparatus 1000, is logically combined with each other, giving a user program or the like the impression that it is a contiguous memory area.

FIG. 2B shows a structure of a transfer request extended from a basic transfer request (hereinafter, also referred to as "extended transfer request", as needed). In addition to the data structure of a basic transfer request, additional information with which the data transfer apparatus 50 identifies the transfer request (hereinafter, also referred to as "tag", as needed) is specified in an extended transfer request. Hereinbelow, when simply referred to as a "transfer request", it could mean both a basic transfer request and an extended transfer request.

Figure 3:
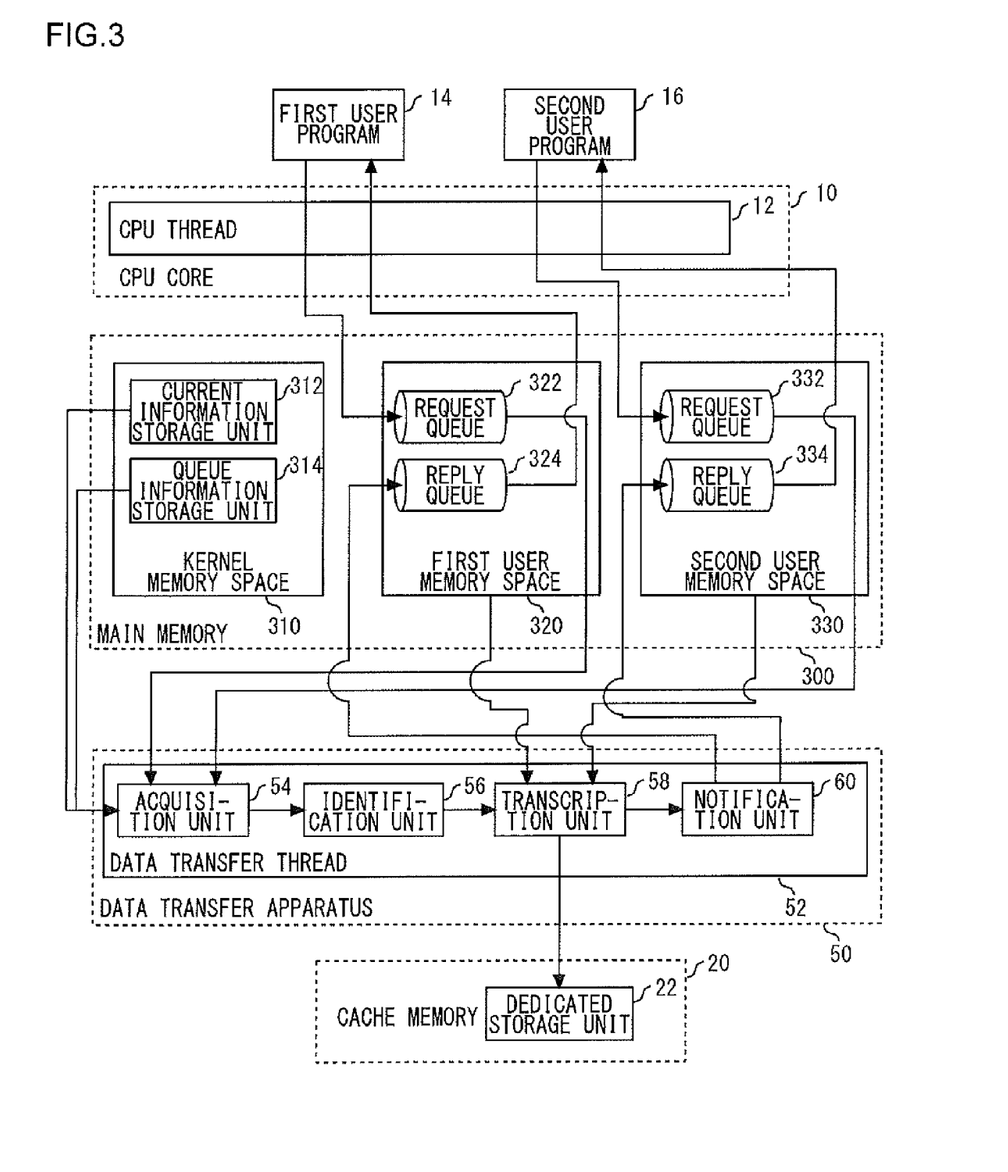
FIG. 3 is a diagram that logically shows a functional configuration of the information processing apparatus shown in FIG. 1.

FIG. 3 logically shows a functional configuration of the information processing apparatus 1000 shown in FIG. 1. Each block indicated with a solid line therein can be implemented by an element, an electronic circuit or a mechanism in terms of hardware, and by a computer program or the like in terms of software; in FIG. 3, functional blocks implemented by the cooperation of those components are illustrated. Therefore, it will be obvious to those skilled in the art that the functional blocks may be implemented in a variety of forms by combinations of hardware and software.

A CPU core 10 includes a CPU thread 12. The CPU thread 12 is the entity executing a first user program 14 and a second user program 16, and is typically a hardware thread. There may be provided multiple CPU threads 12 on a single CPU core 10. When executing a user program, the CPU thread 12 enqueues a transfer request issued by the user program into a request queue, which will be described later, in a user memory space allocated to the user program. Also, the CPU thread 12 dequeues a notification that data transfer is completed, from a reply queue, which will also be described later, in the user memory space allocated to the user program.

The first user program 14 or second user program 16 shown in FIG. 3 represents a unit executed by the CPU thread 12, and it may be a process or a user thread, for example. As a matter of course, multiple user threads regarding a user program may be executed in a time-sharing manner, i.e. multithreading may be implemented.

The cache memory 20 includes as part of the storage area thereof a dedicated storage unit 22. The dedicated storage unit 22 is a storage area to which access is restricted from other than the data transfer apparatus 50. In the embodiment, it will be assumed that access to the dedicated storage unit 22 from the CPU thread 12 is restricted but that from the data transfer thread 52, which will be described later, is not restricted. For example, the CPU thread 12 may refer to data in the dedicated storage unit 22, but the CPU thread may not be allowed to update the data.

The main memory 300 comprises a kernel memory space 310, a first user memory space 320 and a second user memory space 330. The kernel memory space 310 is a memory space allocated to the OS. The first user memory space 320 and second user memory space 330 are memory spaces allocated to the first user program 14 and second user program 16, respectively. Hereinbelow, when simply referred to as a "user memory space", it could mean both the first user memory space 320 and the second user memory space 330.

The first user memory space 320 includes a request queue 322 and a reply queue 324. These are FIFO (First-In First-Out) type storage areas. Into the request queue 322, a transfer request from the first user program 14 is enqueued by the CPU thread 12. The request queue 322 then retains the transfer request until the data transfer thread 52, described later, dequeues the request. Into the reply queue 324, a notification that data transfer performed in response to a transfer request is completed (hereinafter, also referred to as "transfer notification", as needed) is enqueued by the data transfer thread 52. The reply queue 324 then retains the transfer notification until the CPU thread 12 dequeues the notification.

In the case where the first user program 14 is executed using multithreading, multiple pairs of request queues and reply queues may be provided in the first user memory space 320. Also, the threads of the first user program 14 may be related to the pairs of request queues and reply queues with a ratio of one to one, or the ratio may also be N to one.

The second user memory space 330 also includes a request queue 332 and a reply queue 334, which are the same as the request queue 322 and reply queue 324. Hereinbelow, when simply referred to as a "request queue", it could mean both the request queue 322 and the request queue 332; similarly, when simply referred to as a "reply queue", it could mean both the reply queue 324 and the reply queue 334. Also, when simply referred to as a "queue", it could mean both a request queue and a reply queue.

The kernel memory space 310 includes a current information storage unit 312 and a queue information storage unit 314. The current information storage unit 312 retains the address of a queue related to a user program being currently executed by the CPU thread 12. The queue information storage unit 314 retains the address of a queue related to each of one or more user programs executed by the CPU thread 12. When executing a user program, the CPU core 10 refers to the queue information storage unit 314 to identify the address of a queue related to the user program, and then allows the current information storage unit 312 to store the address.

The data transfer apparatus 50 includes a data transfer thread 52. The data transfer thread 52 is the entity performing data transfer processing, and is typically a hardware thread. A data transfer thread 52 is provided so as to be related to a CPU thread 12. In other words, when there are provided multiple CPU threads 12, multiple data transfer threads 52 related to the respective CPU threads 12 are provided. A data transfer thread 52 comprises an acquisition unit 54, an identification unit 56, a transcription unit 58 and a notification unit 60.

The acquisition unit 54 refers to the current information storage unit 312 to acquire the address of a request queue related to a user program being currently executed by the CPU thread 12. The acquisition unit 54 then refers to the request queue to acquire a transfer request therefrom.

When there is no transfer request in the request queue, the acquisition unit 54 refers to the queue information storage unit 314 and acquires the address of a queue related to each of one or more user programs executed by the CPU thread 12. Thereafter, the acquisition unit 54 refers to each of the request queues in a time-sharing manner to acquire a transfer request. Thus, the acquisition unit 54 preferentially acquires a transfer request from a user program being currently executed by the CPU thread 12; when the unit does not acquire any transfer request from the user program, the acquisition unit 54 acquires a transfer request from another user program.

The identification unit 56 retains an address translation table, a TLB (Translation Lookaside Buffer) for example, for translating a virtual address in a user memory space to a physical address in the main memory 300. The identification unit 56 refers to the address translation table to identify the physical addresses of a transfer source and a transfer destination based on the virtual addresses thereof specified in a transfer request. Hereinafter, a physical address corresponding to a transfer source's virtual address and a physical address corresponding to a transfer destination's virtual address are referred to as "transfer source's physical address" and "transfer destination's physical address", respectively, as needed.

The transcription unit 58 identifies, as original data to be transcribed, data having a data size specified in a transfer request and starting from a transfer source's physical address in the main memory 300. The transcription unit 58 then transcribes the original data to a storage area related to a transfer destination's physical address. In the present embodiment, the transcription unit 58 accesses the dedicated storage unit 22 in the cache memory 20 to transcribe the original data to a storage area therein related to the transfer destination's physical address. As a variation, the transcription unit 58 may transcribe the original data to the actual storage area in the main memory 300 indicated by the transfer destination's physical address.

When caching original data in a specific area of the cache memory 20, the transcription unit 58 may evacuate data already stored in the area to a storage area in the main memory 300 corresponding to the specific area, that is, the unit may "cache out" the data. Accordingly, consistency between data stored in the cache memory 20 and data stored in the main memory 300 can be maintained. Particularly, when data update performed in the cache memory 20 is asynchronous to that performed in the main memory 300, e.g. when data update is performed in the write-back method, data should preferably be cached out in advance.

There will be described processing for the case where the transfer request is an extended transfer request that includes, as tag information, a transcription ID, which is identification information with which the transcription unit 58 relates one extended transfer request to another. In this case, the transcription unit 58 regards multiple extended transfer requests containing the same transcription ID as the same group of transfer requests. More specifically, while maintaining the order of these extended transfer requests, i.e. the order in which the requests have been enqueued into a request queue, the transcription unit 58 sequentially processes the extended transfer requests.

For instance, when the acquisition unit 54 acquires these extended transfer requests simultaneously, the transcription unit 58 may enqueue the requests into a transcription queue, not illustrated, according to the order in which the requests are placed in the request queue. Thereafter, when performing transcription processing, the transcription unit 58 may sequentially dequeue the extended transfer requests. Even when processing for an extended transfer request is suspended waiting for an input to or an output from the main memory 300, the transcription unit 58 completes such processing first before performing processing for another extended transfer request. Accordingly, serial processing according to the order of requests can be performed.

When the transcription unit 58 has transcribed original data, the notification unit 60 enqueues a transfer notification for notifying a user program of the completion of processing of a transfer request, into a reply queue in a user memory space allocated to the user program. For example, when data transfer according to a transfer request dequeued from the request queue 322 is completed, the notification unit 60 enqueues a transfer notification for the data transfer into the reply queue 324.

There will be described processing for the case where the transfer request is an extended transfer request that includes, as tag information, a notification ID, which is identification information with which the notification unit 60 relates one extended transfer request to another. In this case, the notification unit 60 regards multiple extended transfer requests containing the same notification ID as the same group of transfer requests. More specifically, when processing of each of the extended transfer requests is completed, the notification unit 60 refers to the request queue and the transcription queue, not illustrated, so as to detect whether or not any extended transfer request containing the notification ID remains therein. When determining that all the extended transfer requests containing the notification ID have been processed, the notification unit 60 enqueues a notification that processing for the notification ID is completed (hereinafter, also referred to as "group processing notification", as needed) into the reply queue.

The notification unit 60 may enqueue a group processing notification alone, instead of individual transfer notifications for the respective extended transfer requests containing the same notification ID. Alternatively, the notification unit 60 may enqueue a group processing notification in addition to individual transfer notifications, i.e. the unit may enqueue a group processing notification after enqueuing the last of transfer notifications. The present embodiment employs the former case.

In the following, the operation performed by the configuration set forth above will be described.

Figure 4:
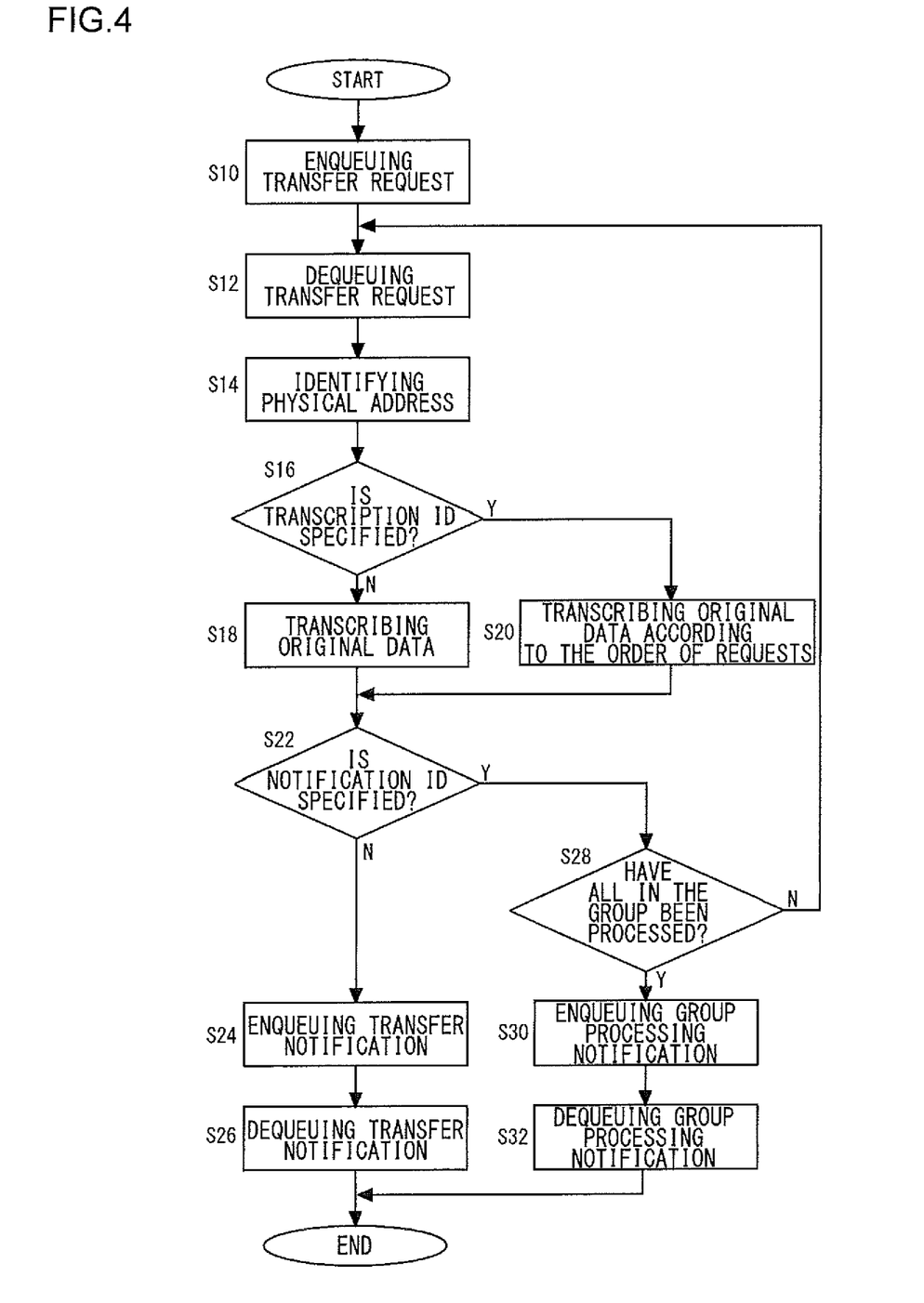
FIG. 4 is a flowchart that shows an operational process of the information processing apparatus shown in FIG. 1.

FIG. 4 is a flowchart that shows an operational process of the information processing apparatus 1000 shown in FIG. 1. A CPU thread 12 executing a user program enqueues a transfer request from the user program into a request queue in a user memory space (S10). The acquisition unit 54 in the data transfer thread 52 refers to the current information storage unit 312 and queue information storage unit 314 so as to identify the address of a queue. The acquisition unit 54 preferentially refers to the request queue related to the user program being currently executed by the CPU thread 12 before referring to other request queues in a time-sharing manner, and then dequeues a transfer request retained in each of the request queues (S12).

The identification unit 56 identifies a transfer source's physical address and a transfer destination's physical address corresponding to a transfer source's virtual address and a transfer destination's virtual address specified in a transfer request, respectively (S14). If no transcription ID is specified in the transfer request (N at S16), the transcription unit 58 will transcribe original data at a location in the main memory 300 indicated by the transfer source's physical address, to a location in the dedicated storage unit 22 of the cache memory 20 related to the transfer destination's physical address (S18). If a transcription ID is specified in the transfer request (Y at S16), the transcription unit 58 will transcribe original data for each of multiple transfer requests containing the transcription ID, according to the order of the transfer requests (S20).

If no notification ID is specified in the transfer request (N at S22), the notification unit 60 will enqueue a transfer notification into a reply queue in the user memory space (S24). The CPU thread 12 will then dequeue the transfer notification from the reply queue (S26), and the user program will be notified of the completion of data transfer.

If a notification ID is specified in the transfer request (Y at S22), and, in addition, it is found that all of a group of transfer requests identified by the notification ID have been processed (Y at S28), the notification unit 60 will enqueue a group processing notification into the reply queue (S30). The CPU thread 12 will then dequeue the group processing notification from the reply queue (S32), and the user program will be notified of the completion of processing for transfer requests in which the notification ID is specified. If any of the group of transfer requests identified by the notification ID has not been processed yet (N at S28), the process will return to S12.

With the processor 100, data transfer according to an instruction from a user program can be performed asynchronously to processing performed by the CPU core 10 executing the user program. Once enqueuing a transfer request in a request queue, the CPU core 10 can perform another processing without waiting for the completion of the requested data transfer. Accordingly, the throughput of the processor 100 can be improved. In other words, a user program can have necessary data transfer performed without burdening a CPU core.

Also, since a transfer request is enqueued or dequeued without OS intervention, the transmission of the transfer request can be performed at high speed between the CPU core 10 and the data transfer apparatus 50. A transfer request from a user program is stored in a user memory space for the user program. Accordingly, even if there is an inadequate transfer request, the influence caused thereby is limited within the user memory space for the user program that has issued the transfer request, thereby preventing transmission of the influence to the other components. Further, the translation from a virtual address to a physical address is also performed by the data transfer apparatus 50, so that processing load on the CPU core 10 can be reduced.

Also, with the processor 100, original data in the main memory 300 can be transferred to the dedicated storage unit 22 of the cache memory 20 according to an instruction from a user program. Accordingly, the CPU core 10 can access data necessary for processing of the user program at high speed. In other words, a developer of a user program can control the caching of necessary data via the user program, thereby improving the execution speed of the user program.

Since data cached by the transcription unit 58 is retained in the dedicated storage unit 22, the influence caused by another entity accessing the cache memory 20 can be excluded. For example, even when the CPU core 10 acquires streaming data for another processing, the influence thereof does not cause the cache-out of data necessary for a user program, that is, cache pollution can be prevented.

The data transfer apparatus 50 preferentially processes a transfer request from a user program being currently executed by the CPU core 10. Accordingly, data necessary for such running user program is preferentially transferred to the cache memory 20, thereby improving the speed of processing the running user program with a higher priority given thereto. If there is no request from a running user program, request queues are referred in a time-sharing manner and a request process is acquired therefrom. Accordingly, data transfer requested by a user program that is not currently executed by the CPU core 10 is also performed, as needed.

Further, with the processor 100, the completion of data transfer to the cache memory 20 performed by the data transfer apparatus 50 can be detected by a user program. Therefore, a developer of a user program can describe program code on the premise that necessary data is placed in the cache memory 20 after a transfer notification or a group processing notification is detected, and hence, the cost of caching out or caching the data is unnecessary.

For instance, prior to performing processing in which repetitive access to given data is required, a transfer request specifying the data is processed. Until a transfer notification therefor is detected, another processing in which the data is not required is performed. Then, after the transfer notification is detected, the processing requiring the data is performed. By describing program code enabling such process as stated above, there can be created a user program that is executed at high speed and optimizes the use of the cache memory 20.

By adding a transcription ID or a notification ID or both to a transfer request, the operation of the transcription unit 58 or notification unit 60 or both can be controlled. With a user program that issues multiple transfer requests with a transcription ID added thereto, processing can be performed on the premise that each of the multiple transfer requests is performed according to the order of the requests. Accordingly, if an order of pieces of data to be accessed by a user program is determined, for example, the speed of accessing each of the pieces of data can be improved sequentially. Also, with a user program that issues multiple transfer requests with a notification ID added thereto, processing can be performed on the premise that, when a group processing notification is received, the transfer of multiple pieces of data related to the notification ID has been completed entirely. Accordingly, if there are multiple pieces of data to be accessed by a user program simultaneously, for example, such pieces of data distributed within a user address space may be cached, thereby improving the speed of accessing each of the pieces of data.

The present invention has been described with reference to the embodiment. The embodiment is intended to be illustrative only and it will be obvious to those skilled in the art that various modifications to constituting elements or processes could be developed and that such modifications also fall within the scope of the present invention.

A modification will now be described. In the embodiment set forth above, the transcription unit 58 in the data transfer thread 52 accesses a storage area in the cache memory 20 according to a transfer destination's physical address in the main memory 300. As a modification, if a storage area in the cache memory 20 is accessible according to a virtual address, the transcription unit 58 may access a storage area in the cache memory 20 according to a transfer destination's virtual address. In such case, it is unnecessary for the identification unit 56 to identify a transfer destination's physical address corresponding to the transfer destination's virtual address.

Another modification will be described. A transfer request may further contain a transfer type, which specifies details of data transfer. If various transfer types can be specified, a wide variety of data transfer control will be provided by a user program. In other words, by using and combining various transfer types properly, a developer can create a user program of which execution speed is higher, or a user program that flexibly modifies the contents of the cache memory.

Hereinbelow, examples of the transfer type will be cited.

Transfer Type "1":

This transfer type specifies data transfer within the main memory 300, in which data is transferred from a storage area specified according to a transfer source's virtual address to a storage area specified according to a transfer destination's virtual address. A transfer request specifies at least a transfer source's virtual address and a transfer destination's virtual address. Also, a data size may further be specified as described in the embodiment, which can also be said for the other transfer types.

Transfer Type "2":

This transfer type specifies processing as described in the embodiment, i.e. caching process in which both a transfer source and a transfer destination are specified. A transfer request specifies at least a transfer source's virtual address and a transfer destination's virtual address.

Transfer Type "3":

This transfer type specifies data transfer from a specific storage area in the main memory 300 to a storage area in the cache memory 20 related to the specific storage area, i.e. caching process between storage areas that are related to each other in advance. A transfer request specifies at least a virtual address that indicates the specific storage area. The identification unit 56 in the data transfer apparatus 50 identifies a physical address corresponding to the virtual address. The transcription unit 58 then transcribes data from a storage area in the main memory 300 indicated by the physical address, to a storage area in the cache memory 20 related to the virtual address or the physical address.

Transfer Type "4":

This transfer type specifies processing reverse to that of the transfer type "2", i.e. caching-out process in which both a transfer source and a transfer destination are specified. A transfer request specifies at least a transfer source's virtual address and a transfer destination's virtual address. The identification unit 56 in the data transfer apparatus 50 identifies physical addresses corresponding to the virtual addresses. The transcription unit 58 then transcribes data from a storage area in the cache memory 20 related to the transfer source's virtual address or the transfer source's physical address, to a storage area in the main memory 300 indicated by the transfer destination's physical address.

Transfer Type "5":

This transfer type specifies processing reverse to that of the transfer type "3", i.e. caching-out process between storage areas that are related to each other in advance. A transfer request specifies at least a virtual address that indicates a specific storage area. The identification unit 56 in the data transfer apparatus 50 identifies a physical address corresponding to the virtual address. The transcription unit 58 then transcribes data from a storage area in the cache memory 20 related to the virtual address or the physical address, to a storage area in the main memory 300 indicated by the physical address.

Since the storage capacity of the cache memory 20 is less than that of the main memory 300, one storage area in the cache memory 20 is related to multiple storage areas in the main memory 300. Accordingly, to maintain consistency between the cache memory 20 and main memory 300, there may be a case where a caching-out process needs to be performed before the transcription unit 58 performs a caching process. Consequently, the time required for data transfer may be relatively long. If the transfer type "4" or "5" is requested before the transfer type "2" or "3" is requested, there will be no need to perform a caching-out process required for the transfer type "2" or "3". As a result, the time required to complete a caching process of the transfer type "2" or "3" can be reduced. For example, a transfer source's virtual address in the transfer type "4" or a virtual address in the transfer type "5" may be specified as a transfer destination's virtual address in the transfer type "2" or a virtual address in the transfer type "3" performed subsequently.

Yet another modification will be described. The technical idea of the present invention is also applicable to data transfer between an external storage apparatus, such as a hard disk and a USB (Universal Serial Bus) flash drive, and the main memory 300, or data transfer between an external storage apparatus and the cache memory 20. That is, such data transfer can also be performed asynchronously to processing performed by a CPU core, according to control provided by a user program.

It will be obvious to those skilled in the art that the function to be achieved by each constituent feature described in the claims may be implemented by each of the constituting elements described in the embodiment or modifications, or by the cooperation of those constituting elements.

What is claimed is:

1. A data transfer apparatus for transferring data in a storage area to another storage area, the apparatus comprising:
   a CPU core, which executes a plurality of user programs;
   an acquisition unit, which acquires a plurality of transfer requests from the plurality of user programs executed by the CPU core asynchronously with processing performed by the CPU core, wherein the transfer requests for each of the plurality of user programs are respectively stored in a predetermined dedicated memory area as a program memory space allocated for a respective requesting user program, and wherein a transfer request specifies at least a virtual address of a transfer source and a virtual address of a transfer destination in the program memory space into which the transfer request is to be stored for the respective requesting user program;
   an identification unit, which identifies a physical address corresponding to a virtual address specified in each of the plurality of transfer requests; and
   a transcription unit, which transcribes original data stored in a storage area indicated by a physical address of a transfer source specified by the identification unit, to a storage area indicated by a virtual address or a physical address of a transfer destination, wherein:

when a transfer request, from a given one of the user programs that is currently being executed by the CPU core, is stored in a respective program memory space allocated to the currently-executed user program, then the acquisition unit refers to the respective program memory space allocated to the currently-executed user program first, so as to acquire the transfer request from the currently-executed user program first, and when no transfer request from the currently-executed user program is stored in a respective program memory space allocated to the currently-executed user, then the acquisition unit refers, in a time-sharing manner, to different program memory spaces allocated, respectively, to other user programs, so as to acquire existing transfer requests from each of the other user programs.

2. The data transfer apparatus of claim 1, wherein the transcription unit transcribes the original data to a storage area in a cache memory related to the virtual address or physical address of the transfer destination.

3. The data transfer apparatus of claim 2, wherein the transcription unit transcribes the original data to the storage area in the cache memory related to the virtual address or physical address of the transfer destination, access to the storage area being restricted from other than the data transfer apparatus.

4. The data transfer apparatus of claim 1, wherein:
the transfer request contains a transcription ID with which the transcription unit relates the transfer request to another transfer request and processes the transfer request; and
the transcription unit sequentially processes a plurality of transfer requests containing a transcription ID, in accordance with the order in which the requests are placed.

5. The data transfer apparatus of claim 1, further comprising a notification unit, which stores, in the respective program memory space, a transfer notification for notifying, when the transcription unit has transcribed the original data, the user program of the completion of processing of the transfer request, so that the CPU core executing the user program acquires the transfer notification asynchronously.

6. The data transfer apparatus of claim 5, wherein:
the transfer request contains a notification ID with which the notification unit relates the transfer request to another transfer request and processes the transfer request; and,
when the transcription unit has processed all of a plurality of transfer requests containing a notification ID, the notification unit stores, as the transfer notification, a notification that processing for the notification ID is completed, in the respective program memory space.

7. A data transfer method for transferring data in a storage area to another storage area, the method comprising:
acquiring a plurality of transfer requests from a plurality of user programs executed by a CPU core asynchronously with processing performed by the CPU core,
wherein the transfer requests for each of the plurality of user programs are respectively stored in a predetermined dedicated memory area as a program memory space allocated for a respective requesting user program and wherein a transfer request specifies at least a virtual address of a transfer source and a virtual address of a transfer destination in the program memory space into which the transfer request is to be stored for the respective requesting user program;

the data transfer method further comprising:
identifying a physical address corresponding to a virtual address specified in each of the plurality of transfer requests; and
transcribing original data stored in a storage area indicated by a physical address of a transfer source specified by the identifying, to a storage area indicated by a virtual address or a physical address of a transfer destination, wherein:

when a transfer request, from a given one of the user programs that is currently being executed by the CPU core, is stored in a respective program memory space allocated to the currently-executed user program, then the acquisition step includes referring to the respective program memory space allocated to the currently-executed user program first, so as to acquire the transfer request from the currently-executed user program first, and when no transfer request from the currently-executed user program is stored in a respective program memory space allocated to the currently-executed user program, then the acquisition step includes referring, in a time-sharing manner, to different program memory spaces allocated, respectively, to other user programs, so as to acquire existing transfer requests from each of the other user programs.

8. A processor, comprising:
a CPU core, which executes a plurality of user programs; and
a data transfer apparatus, which transfers data in a storage area to another storage area,
wherein the CPU core stores a plurality of transfer requests from each of the plurality of user programs respectively in a predetermined dedicated memory area as a program memory space allocated for a respective requesting user program,
wherein the transfer requests specify at least a virtual address of a transfer source and a virtual address of a transfer destination in the program memory space into which the transfer request is to be stored for the respective requesting user program; and
the data transfer apparatus includes:
an acquisition unit, which refers to program memory spaces and acquires the plurality of transfer requests asynchronously with processing performed by the CPU core;
an identification unit, which identifies a physical address corresponding to a virtual address specified in each of the plurality of transfer requests; and
a transcription unit, which transcribes original data stored in a storage area indicated by a physical address of a transfer source specified by the identification unit, to a storage area indicated by a virtual address or a physical address of a transfer destination, wherein:

when a transfer request, from a given one of the user programs that is currently being executed by the CPU core, is stored in a respective program memory space allocated to the currently-executed user program, then the acquisition unit refers to the respective program memory space allocated to the currently-executed user program first, so as to acquire the transfer request from the currently-executed user program first, and when no transfer request from the currently-executed user program is stored in a respective program memory space allocated to the currently-executed user program, then the acquisition unit refers, in a time-sharing manner, to different program memory spaces allocated, respectively, to other user programs, so as to acquire existing transfer requests from each of the other user programs.

* * * * *